March 28, 1967   G. C. TURNER   3,311,773
PHOSPHOR FIBRE FACE PLATE FOR CATHODE-RAY TUBES
Filed Dec. 3, 1962

Inventor
GEORGE C. TURNER
By
Cameron, Kerkam + Sutton
Attorneys 3,311,773
PHOSPHOR FIBRE FACE PLATE FOR
CATHODE-RAY TUBES
George Christie Turner, Manchester, England, assignor to Ferranti, Limited, Hollinwood, Lancashire, England, a company of Great Britain and Northern Ireland
Filed Dec. 3, 1962, Ser. No. 241,668
Claims priority, application Great Britain, Dec. 6, 1961, 43,676/61
5 Claims. (Cl. 313—92)

This invention relates to cathode-ray tubes.

In cathode-ray tubes having a phosphor screen deposited on a glass face plate the light generated by the impingement of the electron beam on the phosphor screen is subject to dispersion when passing through the glass face plate. This dispersion makes it impossible to obtain a satisfactory photograph of the image on the screen of the cathode-ray tube by placing the photographic film in close proximity to the glass face plate.

In order to avoid this dispersion it is known to make the part of the face plate through which the image is transmitted from a bundle of glass fibres extending in a direction parallel to the axis of the cathode-ray tube, the phosphor screen being deposited on the ends of the fibres disposed inside the envelope. In operation, the light generated in the phosphor screen is transmitted through the glass fibres with very little dispersion.

The resolution of cathode-ray tubes of this kind is limited not only by the spot diameter of the electron beam and the diameter of the glass fibres but also by the dispersion of both light and electrons which occurs within the phosphor screen itself.

It is an object of the present invention to provide a cathode-ray tube in which the dispersion which occurs within the phosphor screen is substantially reduced.

According to the present invention a cathode-ray tube includes an envelope having a face plate, at least part of said face plate being made from a bundle of fibres of substantially optically transparent phosphor material extending in a direction parallel to the longitudinal axis of said cathode-ray tube envelope and bonded together in a vacuum tight manner.

Each of said fibres may be coated over its longitudinal surface with a glass of lower refractive index than said transparent phosphor material, said glass being used to bond said fibres together.

Alternatively, each of said fibres may be coated over its longitudinal surface with a glass of lower refractive index than said transparent phosphor material, said glass coating being itself coated with a further material which is used to bond said fibres together.

Figure 1:
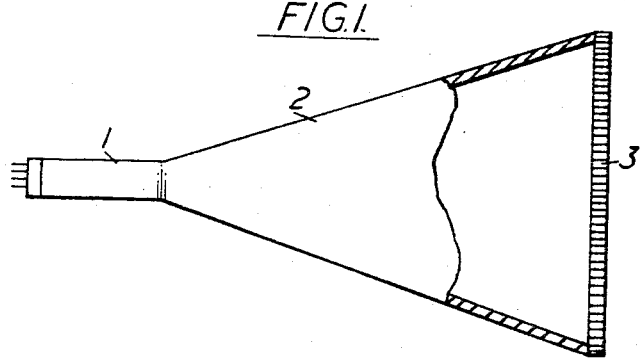
Figure 2:
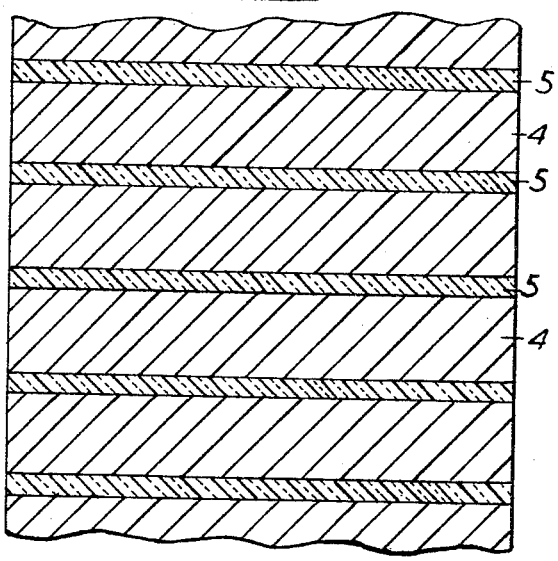

One embodiment of the present invention will now be described by way of example with reference to the accompanying drawings in which:

FIGURE 1 is a part sectionalised elevation of a cathode-ray tube in accordance with the present invention, and FIGURE 2 is an enlarged section of part of the face plate of the envelope of the cathode-ray tube shown in FIGURE 1.

Referring now to the drawings, the cathode-ray tube shown includes an envelope of the usual form having a neck 1, in which are mounted an electron gun and deflector plates (not shown) and a conical portion 2 closed at its wide end by a face plate 3. The whole of the face plate 3 is made from a bundle of fibres 4 (FIGURE 2) of calcium magnesium silicate phosphor activated with cerium, the fibres extending in a direction parallel to the axis of the cathode-ray tube envelope and being bonded together in a vacuum tight manner by a coating 5 of glass on the longitudinal surface of each fibre, the glass having a lower refractive index than the calcium magnesium silicate phosphor, which is substantially optically transparent.

The phosphor fibres 4 are approximately one quarter of an inch in length and for high resolution cathode-ray tubes are drawn to have a diameter of approximately two microns. The phosphor fibres may be drawn to have a circular cross-section but during manufacture of the face plate 3 pressure is applied to the fibres while they are heated to cause the outer coverings of glass to fuse together and during this process the cross-section of the fibres become distorted. This, however, is an advantage since it reduces the light transmission from one fibre to the next.

In operation, the electron beam strikes the face plate 3 and light is emitter from the inner ends of those of the phosphor fibres 4 on which the beam impinges. This light is transmitted through the phosphor fibres 4 to the exterior of the tube, the coatings 5 of glass enhancing the effect of total internal reflection at the longitudinal surfaces of the fibres 4. There is, therefore, very little dispersion of the light.

The face plate 3 of the cathode-ray tube described above is substantially optically transparent. In some applications a black face plate is required and this may be achieved, for example, by coating the inside of the face plate with a layer of carbon. This method, however, suffers from the disadvantage that it introduces a small amount of electron dispersion within the carbon layer. Another method of obtaining a black screen is to make the glass coating on each phosphor fibre of black glass, or to further coat that glass coating on each fibre with black glass, the black glass being used to bond the fibres together. This method is more expensive than the layer of carbon but does not introduce any electron dispersion.

The phosphor fibres may be made of a phosphor other than the calcium magnesium silicate phosphors described above. Another suitable phosphor, for example, is calcium aluminium silicate.

In the cathode-ray tube described above the whole of the face plate 3 has been shown as being made of the glass coated phosphor fibres. If it is not required to use the whole of the face plate for image formation purposes, the parts on which the image is not formed may be made of glass in the usual manner.

What I claim is:

1. A cathode-ray tube including an envelope having a face plate, at least part of said face plate comprising a bundle of fibres of substantially optically transparent phosphor material extending through said face plate in a direction parallel to the longitudinal axis of said cathode-ray tube envelope and means for bonding said fibres together in a vacuum tight manner.

2. A cathode-ray tube as claimed in claim 1 wherein said means for bonding said fibres together includes a glass coating on each of said fibres over its longitudinal surface, said glass coating having a lower refractive index than said transparent phosphor material.

3. A cathode-ray tube as claimed in claim 1 wherein each of said fibres includes a glass coating over its longitudinal surface said glass coating having a lower refractive index than said transparent phosphor material, and said means for bonding said fibres together includes a coating of further material on said glass coating.

4. A cathode-ray tube as claimed in claim 3 in which said further material is black glass.

5. A cathode-ray tube as claimed in claim 1 in which said transparent phosphor material is calcium magnesium silicate phosphor activated with cerium.

References Cited by the Examiner

UNITED STATES PATENTS

| | | | |
|---|---|---|---|
| 2,577,161 | 12/1951 | Smith | 252—301.4 |
| 2,985,784 | 5/1961 | MacNellie | 313—92 |
| 2,996,634 | 8/1961 | Woodcock | 313—92 |
| 3,004,368 | 10/1961 | Hicks | 65—4 |
| 3,019,344 | 1/1962 | Seidman et al. | 250—208 |
| 3,041,456 | 6/1962 | McLeod | 250—80 |
| 3,225,193 | 12/1965 | Hilton et al. | 250—71.5 |

JAMES W. LAWRENCE, *Primary Examiner.*

V. LAFRANCHI, *Assistant Examiner.*